(12) United States Patent
Bonta et al.

(10) Patent No.: US 8,705,382 B2
(45) Date of Patent: Apr. 22, 2014

(54) METHOD OF COMMUNICATION BETWEEN DEVICES OPERATING WITHIN A WIRELESS COMMUNICATION SYSTEM

(75) Inventors: Jeffrey D. Bonta, Arlington Heights, IL (US); Nathan J. Smith, Savoy, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 664 days.

(21) Appl. No.: 12/645,550

(22) Filed: Dec. 23, 2009

(65) Prior Publication Data

US 2011/0149812 A1 Jun. 23, 2011

(51) Int. Cl.
*H04W 4/00* (2009.01)

(52) U.S. Cl.
USPC .......................................... 370/252; 370/328

(58) Field of Classification Search
USPC .......... 370/252, 254, 328, 338, 345; 455/403, 455/406, 425, 436, 450, 460
See application file for complete search history.

(56) References Cited

U.S. PATENT DOCUMENTS

| | | | |
|---|---|---|---|
| 7,043,210 B2 * | 5/2006 | Zhu et al. | 455/102 |
| 8,218,465 B1 * | 7/2012 | Hou et al. | 370/311 |
| 2009/0052428 A1 * | 2/2009 | Ryu et al. | 370/350 |
| 2009/0116430 A1 | 5/2009 | Bonta et al. | |

OTHER PUBLICATIONS

PCT International Search Report Dated Mar. 1, 2011.
Jeff Bonta, et al. "Ad Hoc Relay Frame Structure", IEEE. Piscataway, NJ; No. IEEE C802.16M-08/003. Jan. 16, 2008, pp. 1-11; XP040391541.
J. Bonta, et al. "Ad Hoc Relay Mode for Mobile Coverage Extension and Peer-To-Peer Communications", IEEE, Piscataway, NJ; No. IEEE C802.16M-07/260; Nov. 9, 2007; XP040391447.
IEEE Standard for Local and Metropolitan Area Networks Part 16: Air Interface for Broadband Wireless Access Systems: IEEE STD 802.16-2009 (Revision of IEEE STD 802.16-2004); IEEE Standard, IEEE, Piscataway, NJ; May 29, 2009, pp. C1-2004; XP017604205; ISBN: 978-0-7381-5919-5.

* cited by examiner

*Primary Examiner* — Yemane Mesfin
*Assistant Examiner* — Mon Cheri Davenport
(74) *Attorney, Agent, or Firm* — Steven May

(57) ABSTRACT

A subscriber station (SS) utilizes uplink resources that have been assigned to it for communicating with an infrastructure station to exchange data with a neighboring SS while maintaining its link to the infrastructure station. This is accomplished by the SS receiving an uplink allocation from the infrastructure station, transmitting a subscriber-to-infrastructure station header and trailer to the infrastructure station using the modulation and coding scheme (MCS) assigned by the infrastructure station and also transmitting a subscriber-to-subscriber (S2S) message payload, optionally using a second MCS level appropriate for the link between itself and the receiving SS. The subscriber to infrastructure station message is composed so that it occupies the first m codewords and contains a header that describes the length of the subscriber to infrastructure station message. The subscriber to infrastructure station message, then, is followed by the S2S message, composed to occupy the remaining symbols of the allocation.

17 Claims, 9 Drawing Sheets

METHOD OF COMMUNICATION BETWEEN DEVICES OPERATING WITHIN A WIRELESS COMMUNICATION SYSTEM

FIELD OF THE DISCLOSURE

The present disclosure relates generally to wireless communication systems and more particularly to a method of communication between devices operating within a wireless communication system.

BACKGROUND

Many wireless communication systems today are composed of a number of fixed base stations (BS) which are distributed geographically over a network coverage area and are communicatively coupled together either via wired links or wireless links. Wireless communication devices (also referred to as "subscriber stations (SSs)", mobile devices, and the like) within coverage of a base station can communicate via the base station with other subscriber stations within coverage of the base station.

Time Division Duplexing (TDD) refers to a transmission scheme that allows an asymmetric flow for uplink and downlink transmission which is more suited to data transmission. In a Time Division Duplex system, a common carrier is shared between the uplink and downlink, the resource being switched in time. Users are allocated one or more timeslots for uplink and downlink transmission.

Examples of TDD scheduled mobile radio systems include communication systems operating using Time Division Code Division Multiple Access (TD-CDMA) air interface, Time Division Synchronous Code Division Multiple Access (TD-SCDMA), Digital Enhanced Cordless Telecommunications (DECT), Institute of Electrical and Electronics Engineers (IEEE) 802.16 Worldwide Interoperability for Microwave Access (WiMAX), and Long Term Evolution (LTE).

For example, Institute of Electrical and Electronics Engineers (IEEE) 802.16 is a point-to-multipoint (PMP) system with one hop links between a base station (BS) and a subscriber station (SS). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA. The Institute of Electrical and Electronics Engineers (IEEE) 802.16 Working Group on Broadband Wireless Access Standards is a unit of the IEEE 802 LAN/MAN Standards Committee that aims to prepare formal specifications to support the development and deployment of broadband Wireless Metropolitan Area Networks.

LTE (Long Term Evolution) refers to a new air interface that is being developed by 3GPP in its Release 8 Specification set. Any of the 3GPP standards or specifications referred to herein may be obtained at http://www.3gpp.org/specifications.

LTE will provide users with an experience similar to that of fixed line broadband both in terms of bandwidth and latency, meaning applications that can be delivered today on fixed line will soon be available over the air and fully mobility with LTE.

Time Division Duplexing (TDD) systems such as IEEE 802.16 and similar mobile/base style systems, such as LTE, provide no method of transmitting data directly between subscriber stations (SS). Instead, all data transferred from one SS to another must be sent through the base station (BS). A more efficient method of transferring data is to send it directly from one SS to another. However, as the standards do not currently support this functionality, a method of providing the functionality without modifying the standards is desired.

Accordingly, there is a need for a method and apparatus for enhanced subscriber-to-subscriber communication within a wireless communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
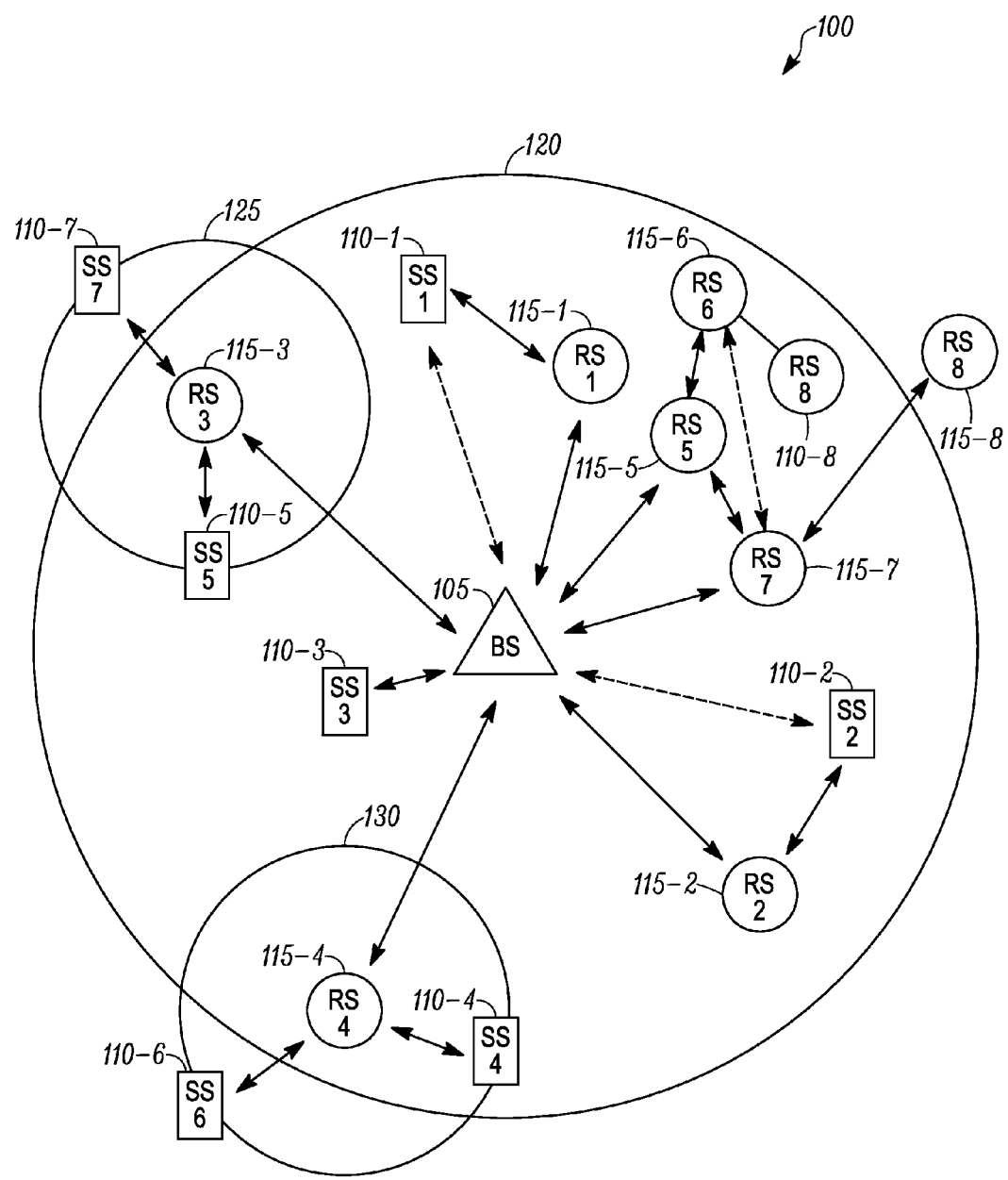
FIG. 1 illustrates a wireless communication network for use in the implementation of at least some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method is provided herein whereby a subscriber station (SS) may use uplink resources that have been assigned to it for communicating with an infrastructure station such as a base station (BS) or a relay station (RS) to exchange data with a neighboring SS while maintaining its link to the infrastructure station. It does this by receiving an uplink allocation, for example, from a base station, transmitting a subscriber-to-infrastructure station header and trailer to the infrastructure station using the modulation and coding scheme (MCS) assigned by the infrastructure station and also transmitting a subscriber-to-subscriber (S2S) message payload, optionally using a second MCS level appropriate for the link between itself and the receiving SS. The subscriber station to infrastructure station message is composed so that it occupies the first m codewords and contains a header that describes the length of the subscriber station to infrastructure station message. The subscriber station to infrastructure station message, then, is followed by the S2S message, composed to occupy the remaining symbols of the allocation. This second part is hidden behind the portion that the infrastructure station will attempt to process, so the infrastructure station is effectively unaware of its contents. The CRC or similar error detection mechanism is calculated based on how data transmitted at a first MCS would be interpreted by a station receiving that data and expecting a second MCS. This approach does not require any changes to infrastructure station equipment and can be implemented completely in subscriber devices. This approach allows a single transmission to be received and meaningfully interpreted by multiple stations. It allows existing systems to be retrofitted with direct link capabilities without requiring an upgrade to the existing infrastructure.

FIG. 1 illustrates a wireless communication network for use in the implementation of at least some embodiments. FIG. 1 illustrates a particular non-limiting example of one network configuration, specifically an IEEE 802.16 network 100. As illustrated, the network 100 includes at least one base station 105 for communication with a plurality of subscriber stations 110-$n$ (also known as mobile stations). It will be appreciated that although only one base station is illustrated in FIG. 1 for simplicity purposes, any number of base stations can be included within the network 100. The network 100 further includes a plurality of relays 115-$n$ (also known as relay stations or repeaters). The relays 115-$n$ are deployed in the areas with poor coverage and relay transmissions so that subscriber stations 110-$n$ in a cell boundary can connect using high data rate links. In some cases relays 115-$n$ may also serve subscriber stations 110-$n$ that are out of the coverage range of the base station 105. In some networks, the relays 115-$n$ are simpler versions of the base station 105, in that they do not manage connections, but only assist in relaying data. Alternatively, the relays 115-$n$ can be at least as complex as the base station 105. Further, all or some of the relay stations 115 can be deployed in a multi-hop pattern. In other words, some relays such as 115-6 communicate with the base station 105 via other relays such as 115-5. Further, these relays can be within each other's coverage. RS5 115-5 is considered to be an ascendant station (i.e., a station through which RS6 115-6 communicates with the BS) for RS6 115-6 and RS6 115-6 is considered to be a descendant station for RS5 115-5.

Figure 2:
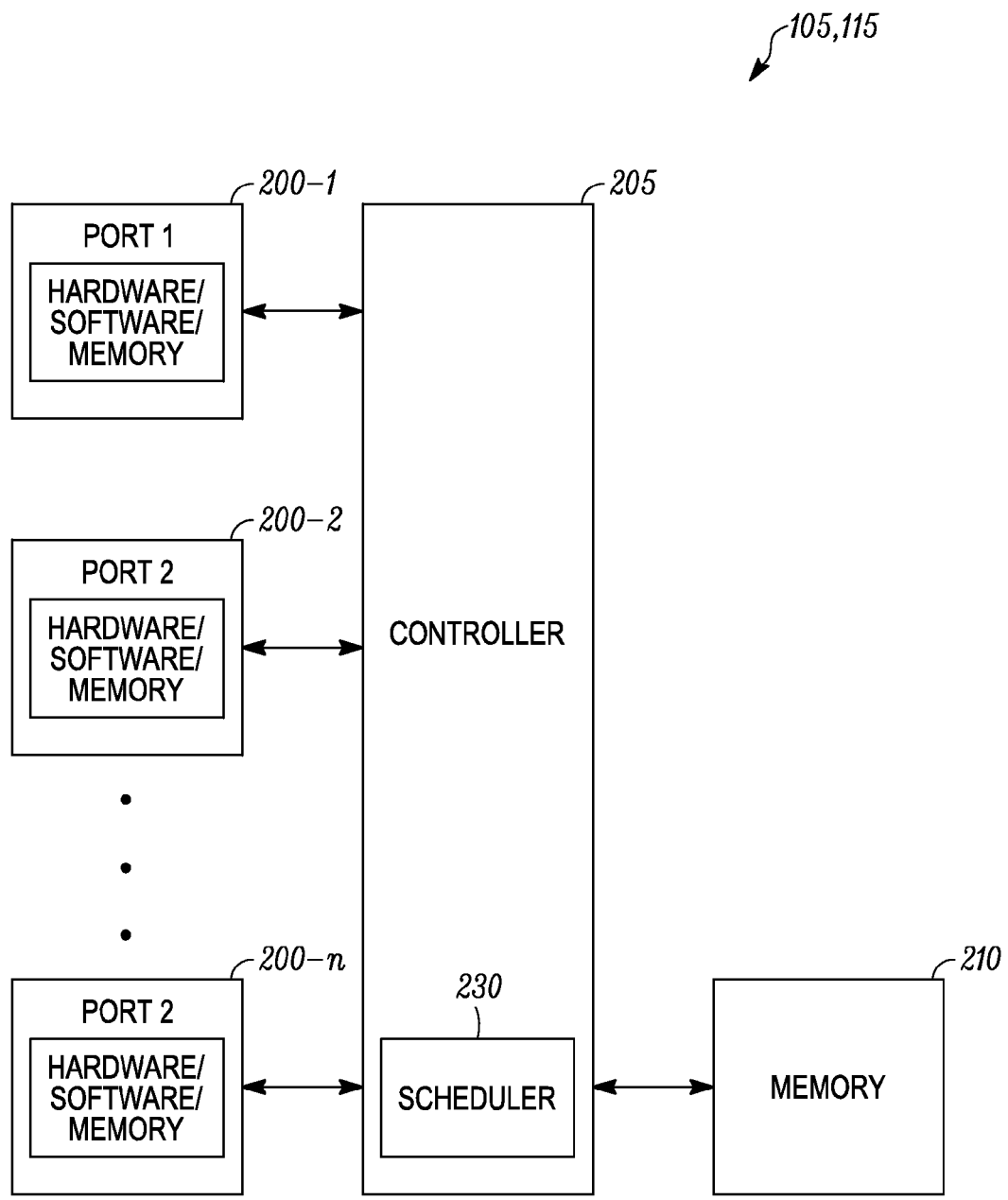
FIG. 2 illustrates an infrastructure station for use in the wireless communication network of FIG. 1 in accordance with at least some embodiments.

FIG. 2 illustrates an infrastructure station such as a base station 105 or a relay station 115 of FIG. 1 in accordance with at least some embodiments. As illustrated, the infrastructure station comprises a plurality of ports 200-$n$, a controller 205, and a memory 210.

Each port 200-$n$ provides an endpoint or "channel" for network communications by the infrastructure station. Each port 200-$n$ may be designated for use as, for example, an IEEE 802.16 port or a backhaul port. For example, the infrastructure station can communicate with one or more other base stations and/or relay stations and/or one or more subscriber stations within an 802.16 network using an IEEE 802.16 port. An IEEE 802.16 port, for example, can be used to transmit and receive both data and management information.

A backhaul port similarly can provide an endpoint or channel for backhaul communications by the infrastructure station. For example, the infrastructure station can communicate with one or more other infrastructure stations using the backhaul, which can be wired or wireless, via the backhaul port.

Each of the ports 200-$n$ are coupled to the controller 205 for operation of the infrastructure station. Each of the ports employs conventional demodulation and modulation techniques for receiving and transmitting communication signals respectively, such as packetized signals, to and from the infrastructure station under the control of the controller 205. The packetized data signals can include, for example, voice, data or multimedia information, and packetized control signals, including node update information.

The controller 205 includes a scheduler 230 for the management of both uplink and downlink communication with the various subscriber stations (SS) 110-$n$ and relay stations (RS) 115-$n$ associated with the infrastructure station. It will be appreciated by those of ordinary skill in the art that the scheduler 230 can be hard coded or programmed into the infrastructure station during manufacturing, can be programmed over-the-air upon customer subscription, or can be a downloadable application. It will be appreciated that other programming methods can be utilized for programming the scheduler 230 into the infrastructure station. It will be further appreciated by one of ordinary skill in the art that the scheduler 230 can be hardware circuitry within the infrastructure station. In accordance with the present invention, the scheduler 230 can be contained within the controller 205 as illustrated, or alternatively can be an individual block operatively coupled to the controller 205 (not shown).

To perform the necessary functions of the infrastructure station, the controller 205 is coupled to the memory 210, which preferably includes a random access memory (RAM), a read-only memory (ROM), an electrically erasable programmable read-only memory (EEPROM), and flash memory.

It will be appreciated by those of ordinary skill in the art that the memory 210 can be integrated within the infrastructure station, or alternatively, can be at least partially contained within an external memory such as a memory storage device. The memory storage device, for example, can be a subscriber identification module (SIM) card.

Figure 3:
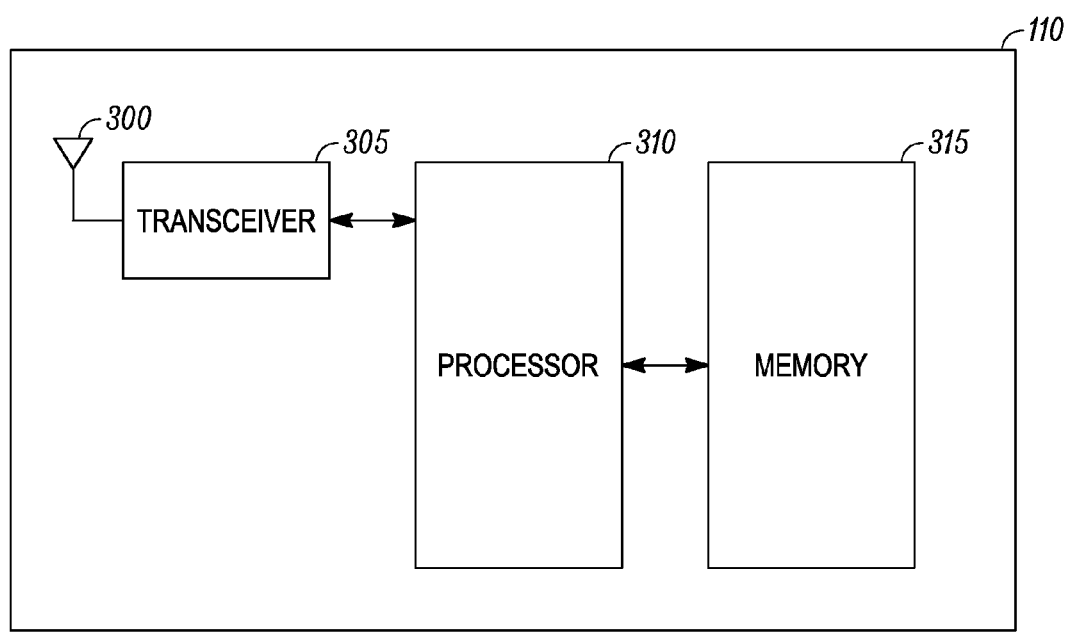
FIG. 3 is an electronic block diagram of a subscriber station for use in the wireless communication network of FIG. 1 in accordance with at least some embodiments.

FIG. 3 is an electronic block diagram of a subscriber station 110 in accordance with at least some embodiments. The terminology "subscriber station" and "mobile station" are used interchangeably herein to refer to subscribers who may be fixed, nomadic or mobile. As illustrated, the subscriber station 110 includes an antenna 300, a transceiver (or modem) 305, a processor 310, and a memory 315.

The antenna 300 intercepts transmitted signals from one or more base stations 105, one or more relay stations 115, and/or one or more subscriber stations 110 within the network 100 and transmits signals to the one or more base stations 105, one or more relay stations 115, and/or one or more subscriber stations 110 within the network 100. The antenna 300 is coupled to the transceiver 305, which employs conventional demodulation techniques for receiving and transmitting communication signals, such as packetized signals, to and from the subscriber station 110 under the control of the processor 310. The packetized data signals can include, for example, voice, data or multimedia information, and packetized control signals, including node update information. When the transceiver 405 receives a command from the processor 310, the transceiver 305 sends a signal via the antenna 300 to one or more devices within the network 100. For example, the subscriber station 110 can communicate with one or more base stations and/or one or more relay stations and/or one or more subscriber stations within an 802.16 network by the antenna 300 and the transceiver 305 using IEEE 802.16, for example, to transmit and receive both data and management information.

In an alternative embodiment (not shown), the subscriber station 110 includes a receive antenna and a receiver for receiving signals from the network 100 and a transmit antenna and a transmitter for transmitting signals to the network 100. It will be appreciated by one of ordinary skill in the art that other similar electronic block diagrams of the same or alternate type can be utilized for the subscriber station 110.

Coupled to the transceiver 305, is the processor 310 utilizing conventional signal-processing techniques for processing received messages. It will be appreciated by one of ordinary skill in the art that additional processors can be utilized as required to handle the processing requirements of the processor 310.

To perform the necessary functions of the subscriber station 110, the processor 310 is coupled to the memory 315, which preferably includes a random access memory (RAM), a read-only memory (ROM), an electrically erasable programmable read-only memory (EEPROM), and flash memory. It will be appreciated by those of ordinary skill in the art that the memory 315 can be integrated within the subscriber station 110, or alternatively, can be at least partially contained within an external memory such as a memory storage device. The memory storage device, for example, can be a subscriber identification module (SIM) card.

In most (time division duplex) TDD scheduled mobile radio systems, such as LTE and 802.16, subscriber stations (SS) request uplink resources from an infrastructure station such as a relay station (RS) or a base station (BS). The infrastructure station allocates uplink resources and assigns a Modulation and Coding Scheme (MCS) to those resources. Subscriber stations may use the assigned resources only for transmitting data directly to the infrastructure station.

It will be appreciated by those skilled in the art that although the remaining embodiments are described in terms of a transmitting subscriber station communicatively coupled to a base station and another subscriber station coupled to the same base station, alternative embodiments of implementation within the scope of the invention include, and are not limited to a subscriber station and a relay station, and also the two subscriber stations can be connected to the same or different base stations or the same or different relay stations or any combination, thereof.

Figure 4:
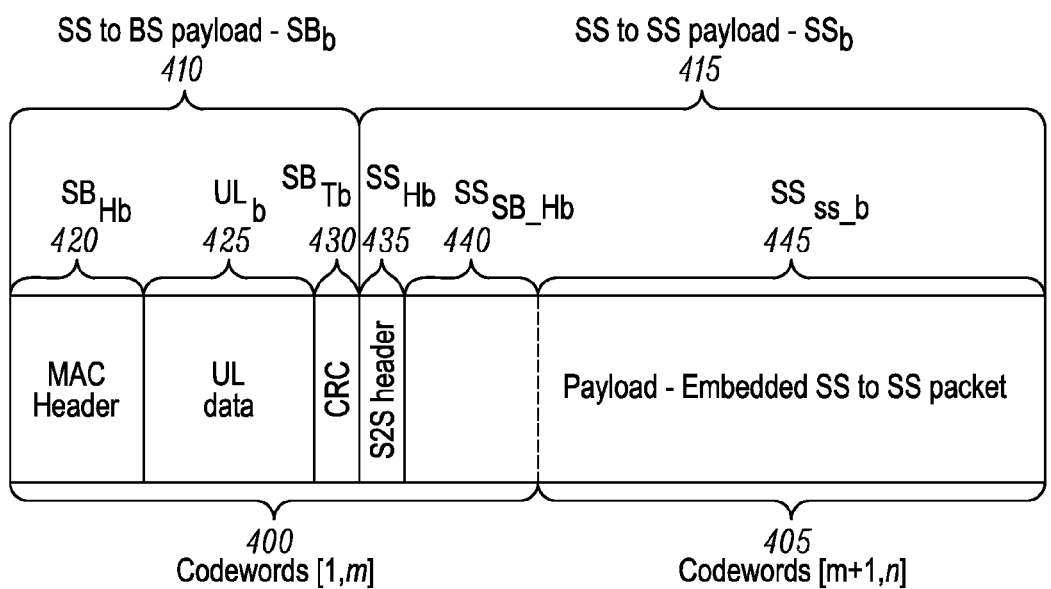
FIG. 4 illustrates a transmission structure for communication within the wireless communication network of FIG. 1 in accordance with at least some embodiments.

FIG. 4 illustrates one embodiment of a transmission structure in which the resources are used to transmit data directly to a neighboring SS by encoding a portion of the transmission at the MCS instructed and expected by a BS and optionally a second portion of the data at a second MCS receivable by a neighboring SS. This can be done even in the case where the base station is not expecting a subscriber to subscriber exchange. By carefully structuring the transmission, the portion of the data intended for the neighboring SS will be located such that the BS is not aware that the subscriber to subscriber data is being transmitted.

As illustrated in FIG. 4, codewords [1, m] 400 are transmitted at the subscriber station to base station MCS and codewords [m+1, n] 405 are transmitted at the subscriber station to subscriber MCS. Codewords [1, m] 400 include a Media Access Control (MAC) header ($SB_{Hb}$) 420, uplink (UL) data ($UL_b$) 425, a cyclic redundancy check (CRC) ($SB_{Tb}$) 430, a subscriber to subscriber header ($SS_{Hb}$) 435, and a portion ($SS_{SB-Hb}$) 440 of an embedded subscriber to subscriber packet payload. Codewords [m+1, n] 405 include a second portion ($SS_{SS\_b}$) 445 of the embedded subscriber to subscriber packet payload.

The subscriber station to base station payload ($SB_b$) 410 includes the Media Access Control (MAC) header ($SB_{Hb}$) 420, the uplink (UL) data ($UL_b$) 425, and the cyclic redundancy check (CRC) ($SB_{Tb}$) 430. The subscriber station to subscriber station payload ($SS_b$) 415 includes the subscriber to subscriber header ($SS_{Hb}$) 435 and both the portion ($SS_{SB-Hb}$) 440 and the second portion ($SS_{SS\_b}$) 445 of the embedded subscriber to subscriber packet payload.

Figure 5:
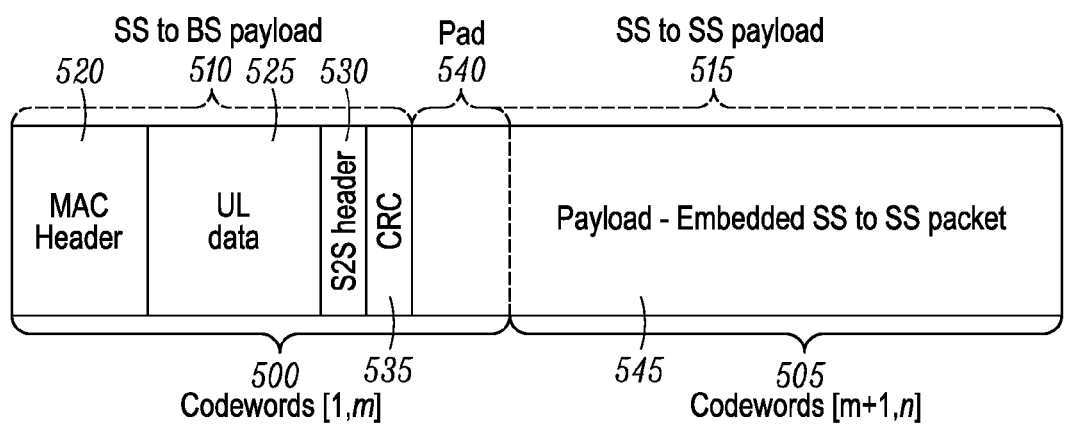
FIG. 5 illustrates an alternative transmission structure for communication within the wireless communication network of FIG. 1 in accordance with at least some embodiments.

FIG. 5 illustrates an alternative embodiment of a transmission structure in which the resources are used to transmit data directly to a neighboring SS. In this embodiment, the subscriber to subscriber portion of the transmission begins in the first codeword after the subscriber station to base station portion of the transmission (i.e. codeword m+1). Whatever parts of the first m codewords that are not filled by uplink data messages are filled with pad bits.

As illustrated in FIG. 5, codewords [1, m] 500 are transmitted at the subscriber station to base station MCS and codewords [m+1, n] 505 are transmitted at the subscriber station to subscriber MCS. Codewords [1, m] 500 include a Media Access Control (MAC) header ($SB_{Hb}$) 520, uplink (UL) data ($UL_b$) 525, a subscriber to subscriber header ($SS_{Hb}$) 530, a cyclic redundancy check (CRC) ($SB_{Tb}$) 535, and a pad 540. Codewords [m+1, n] 505 include the embedded subscriber to subscriber packet payload 545.

The subscriber station to base station payload ($SB_b$) 510 includes the Media Access Control (MAC) header ($SB_{Hb}$) 535, the uplink (UL) data ($UL_b$) 525, the subscriber to subscriber header ($SS_{Hb}$) 530, and the cyclic redundancy check (CRC) ($SB_{Tb}$) 535. The subscriber station to subscriber station payload ($SS_b$) 515 includes just the embedded subscriber to subscriber packet payload 545.

Although it will be appreciated that either embodiment can be implemented, subsequent discussions hereinafter will revolve around the method described previously and illustrated in FIG. 1.

An SS wishing to transmit data directly to another SS using resources allocated for an SS-to-BS (S2B) link encodes and modulates the first m codewords of its transmission using an MCS ($SB_{MCS}$) dictated by the BS (see FIG. 4). The $SB_{MCS}$ is composed of a rate ($SB_{rate}$) and modulation ($SB_{mod}$). The first m codewords are comprised of at least any messages expected by the BS including optional uplink data messages. Some of the first m codewords may optionally contain a header instructing the receiving SS how to decode the transmission in order to recover the S2S payload portion. The $m^{th}$ codeword may also include a portion of the S2S payload as necessary to fill the codeword.

The remaining portion of the transmission, the portion beginning after the $m^{th}$ and up to and including the $n^{th}$ codeword, are encoded and modulated either at the MCS ($SB_{MCS}$) dictated by the BS, or optionally at an MCS ($SS_{MCS}$) achievable between the pair of SSs and ideally optimized for the number of symbols available in this region. The coding rate and modulation chosen for this link are labeled $SS_{rate}$ and $SS_{mod}$. The S2S data transmitted at the $SS_{MCS}$ is comprised of any payload portion of the transmitted message that was not contained in any of the first m codewords.

In order to prevent the BS from attempting to process the transmitted data that exists after the S2B message, the transmitting SS composes the size, length or similar field of the S2B header to indicate that the S2B data is the extent of the message. For example, if the total of all the uplink data messages were 100 bytes followed by 1500 bytes of S2S data, then the length field of the S2B header should be set equal to 100 bytes assuming that the header describes the total transmission length. This should prevent the BS from attempting to process anything beyond the first 100 bytes of the transmission.

The transmitting subscriber station also composes error detection or correction mechanisms, such as a cyclic redundancy check (CRC), checksum, parity bit array, etc, accordingly. That is, the mechanism only covers the S2B portion of the transmitted message (i.e. the first $SB_{Hb}+UL_b$ bits) and should not cover the S2S portion, though a second error detection or correction mechanism may be included to cover that part.

The parameters required to receive the S2S portion of the transmission could be known by the receiving SS a priori, calculated from the known transmission parameters or included in the transmission. If the receive parameters are not known a priori and cannot be calculated, then they must be communicated to the receiving SS in some way. One way to do this is to place a header containing receive parameters somewhere in the first m codewords, which are sent using the $SB_{MCS}$. The receiving SS would demodulate and decode codewords at the $SB_{MCS}$ until the header is found, at which point the station would learn the location of the S2S payload transmitted using the SSMCS. The S2S header could be placed after all of the S2B data, as shown in FIG. 4, or could be placed inside of the uplink data, as shown in FIG. 5. The receiving SS could learn the $SB_{MCS}$ by receiving broadcast resource assignments, such as the 802.16 UL-MAP. Alternately, the S2S header could be included at a fixed rate and placed at a known symbol offset into the allocation. In either case, the S2S header could be used to transport fields such as the $SS_{MCS}$ used, the number of $SS_{MCS}$ symbols, the number of S2S payload bits, etc. There are likely other methods, such as using predefined fixed S2S parameters, to achieve a similar effect.

The embedded S2S payload is encoded at the $SS_{MCS}$. The BS will demodulate and decode the entire received transmission using $SB_{MCS}$. Provided there are favorable channel conditions, the first m codewords, which contains the MAC header, any uplink traffic, and potentially an S2S header and a portion of the S2S payload, will be demodulated and decoded without error by the BS. Because the length, size or similar field of the transmitted MAC header describes the message as being contained only within the first m codewords, the BS ignores all data that occurs after the indicated number of bytes. As a result, the error detection or correction mechanism should operate without fault even though an incorrect MCS was used to decode the transmission of codewords [m+1, n]

Figure 6:
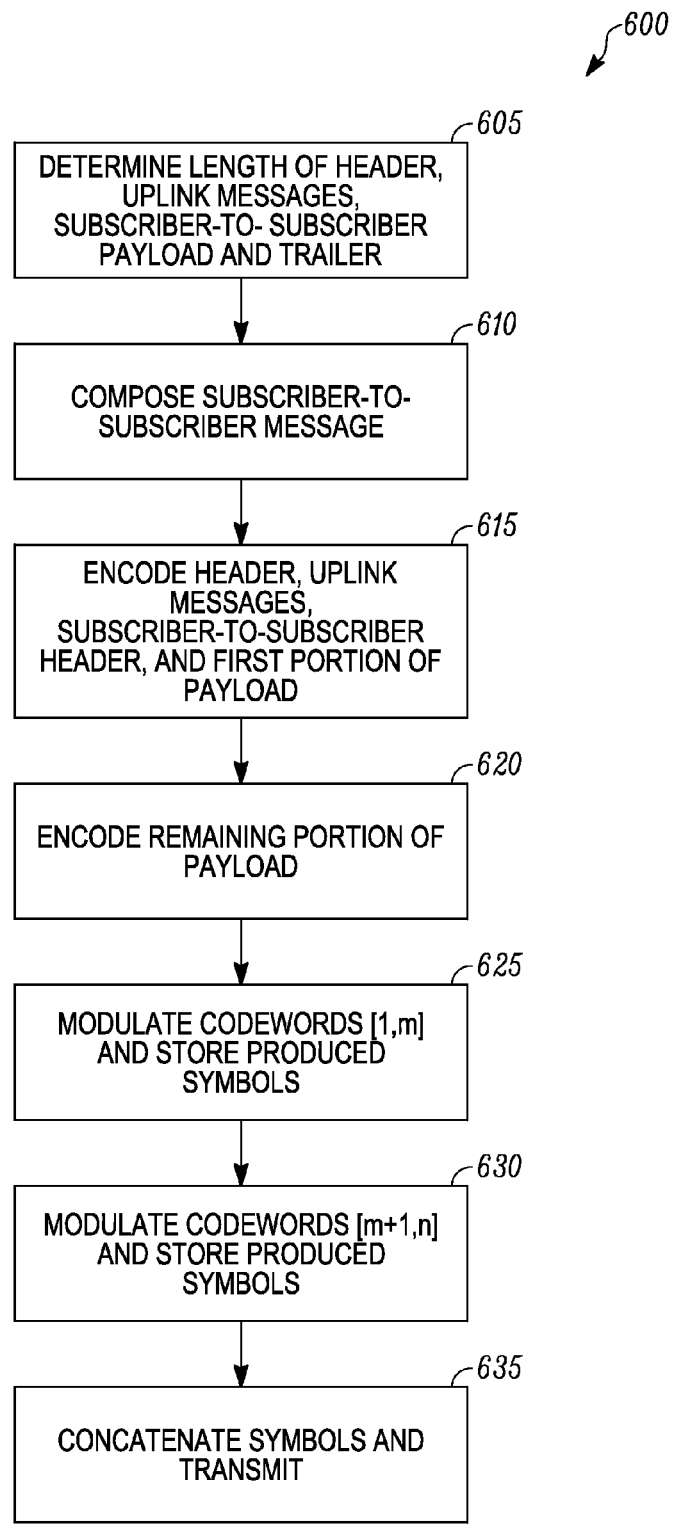
FIG. 6 illustrates an operation of a transmitting subscriber station when composing a data transmission in accordance with some embodiments.
Figure 7:
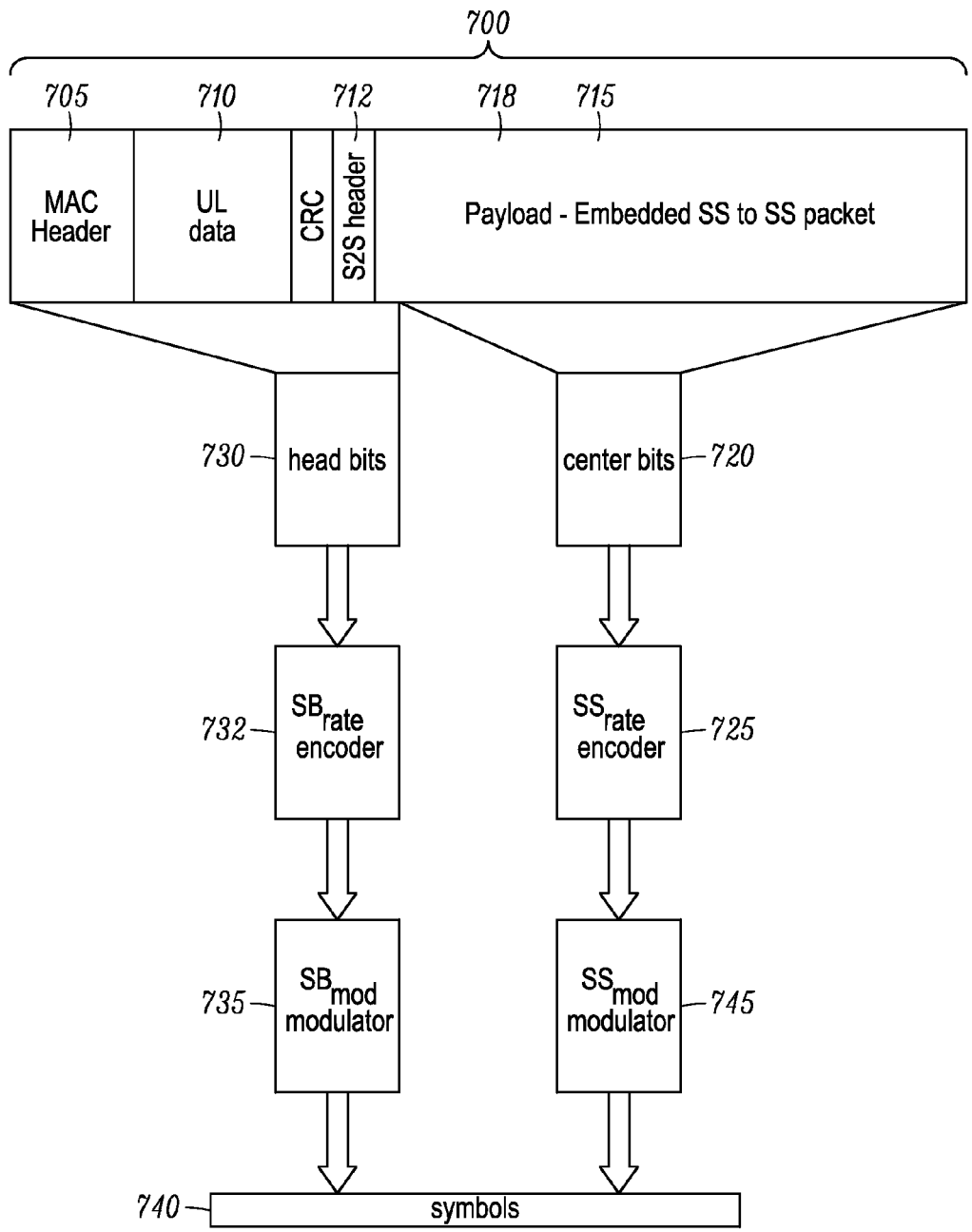
FIG. 7 illustrates the operation of FIG. 6 in terms of the various components of the data transmission in accordance with some embodiments.

FIG. 6 illustrates an operation 600 of a transmitting subscriber station when composing its transmission to a BS and a neighboring SS in accordance with some embodiments. FIG. 7 illustrates the operation of FIG. 6 in terms of the various components of the data transmission 700 in accordance with some embodiments.

The operation 600, as illustrated, begins with Step 605 in which the transmitting SS determines the length of the header (705), uplink messages (710), subscriber-to-subscriber (S2S) payload (715) and trailer (It will be appreciated by those of ordinary skill in the art that the trailer is the CRC for the first m codewords). The calculations of transmit durations in symbols and bits will be discussed hereinafter with regards to Tables 1 through 3.

Next, in Step 610, the transmitting subscriber station composes the S2S message to be transmitted such that it occupies $SS_b$ bits including all embedded headers, where $SS_b$ represents the number of unused bits from the first m codewords and the number of unused bits from the last n−m+1 codewords. The S2S payload is segmented or aggregated as necessary and pad bits are added as needed.

Next, in Step 615, the transmitting subscriber station encodes (encoder 732) the header (705), uplink data messages (710), S2S header (712) and first $SS_{SB\_Hb}$ bits (718) of the S2S payload using the $SB_{MCS}$.

Next, in Step 620, the transmitting subscriber station encodes (encoder 725) $SS_{SS\_b}$ S2S payload bits (720) in the range ($SS_{SB\_Hb}$, $SS_b$) at the $SS_{rate}$ generating codewords [m+1, n].

Next, in Step 625, the transmitting subscriber station modulates (modulator 735) codewords [1, m] (the subscriber-to-base header (705), uplink messages (710), S2S header (712) and first bits of the S2S payload (718)) (head bits 730) using $SB_{mod}$ generating pad symbols as necessary and stores all produced symbols (symbols 740).

Next, in Step 630, the transmitting subscriber station modulates (modulator 745) codewords [m+1, n] (the S2S payload (715)) (center bits 720) using $SS_{mod}$ generating pad symbols as necessary and store all the produced symbols (symbols 740). Alternatively, a rate matching mechanism could be used to fill all available symbols in codewords [m+1, n].

Next, in Step 635, the transmitting subscriber station concatenates the symbols and transmits.

The BS will demodulate and decode the transmission using $SB_{MCS}$. Because the BS is using $SB_{MCS}$ to receive the transmission, the data in the $SS_{MCS}$ section will be received differently than it was transmitted. However, because the S2B MAC header indicates that the message only occupies the first $SB_b$ bits of the transmission, no part of the incorrectly demodulated and decoded transmission is processed by the BS.

Calculations of Transmit Durations in Symbols and Bits

The following calculations assume that no rate matching or code puncturing is being employed in order to match the number of bits coded at the $SB_{MCS}$ to the number of available symbols. Instead, it is assumed that code words are designed to produce a number of symbols evenly divisible by the associated modulation.

Before the constant and variable definitions are provided, an explanation must be given as to what is considered a symbol. A symbol is traditionally a time unit only. However, Orthogonal Frequency-Division Multiple Access (OFDMA) provides the ability to transfer multiple modulated constellations within a single symbol time; e.g. each subcarrier is modulated independently and can thus carry a different meaning during each symbol time.

TABLE 1

List of constants and their definitions

| Value | Definition |
|---|---|
| S | Number of data symbols in the allocation |
| $SB_{rate}$ | Coding rate from subscriber to base (S2B) |
| $SB_{mod}$ | Number of modulated bits per symbol achievable on the S2B link |
| $SS_{rate}$ | Coding rate from subscriber to subscriber (S2S) |
| $SS_{mod}$ | Number of modulated bits per symbol achievable on the S2S link |
| $SB_{Hb}$ | Header size (in bits) required in S2B message |
| $SB_{Tb}$ | Trailer size (in bits) required in S2B message |
| $UL_b$ | Number of uplink message bits |
| $SS_{Hb}$ | Number of bits in S2S header |
| $SB_{CW\_length}$ | Length, in symbols, of a codeword using $SB_{rate}$ and $SB_{mod}$ |

TABLE 2

Station-to-base variables, their equations and definitions

| Variable | Equation | Definition |
|---|---|---|
| $SB_b$ | $SB_{Hb} + UL_b + SB_{Tb}$ | Total number of bits in the S2B part of the transmission. |
| $SB_{Hs}$ | $\dfrac{SB_{Hb} + UL_b + SB_{Tb} + SS_{Hb}}{SB_{rate} \times SB_{mod}}$ | Number of symbols, whole and fractional, required to send the composite header containing the required S2B header, uplink message bits and S2S header |
| $CW_{whole}$ | $\left\lfloor \dfrac{S}{SB_{CW\_length}} \right\rfloor$ | Number of whole codewords that fit in an allocation of S symbols |
| $CW_H$ | $\left\lceil \dfrac{SB_{Hs}}{SB_{CW\_length}} \right\rceil$ | Number of codewords required to transmit $SB_{Hs}$ symbols |
| $SB_{H\_unused}$ | $\begin{cases} CW_H \times SB_{CW\_length} - SB_{Hs} &, CW_H \le CW_{whole} \\ S - SB_{Hs} &, CW_H > CW_{whole} \end{cases}$ | Number of symbols from the S2B header codewords that are not used by the header/uplink messages |

TABLE 3

Station-to-station variables, their equations and definitions

| | | |
|---|---|---|
| $SS_S$ | $S - (SB_{Hs} + SB_{H\_unused})$ | Number of symbols available for transmission at the $SS_{MCS}$ |
| $SS_{SB\_Hb}$ | $SB_{H\_unused} \times SB_{rate} \times SB_{mod}$ | Number of bits available in the unused part of the S2B leading codewords transmitted at the $SB_{MCS}$ |
| $SS_{SS\_b}$ | $\lfloor SS_S \times SS_{rate} \times SS_{mod} \rfloor$ | Total number of whole bits available to the S2S payload in the $SS_{MCS}$ transmission part. Here again a floor function is required because a fractional number of bits can be generated from certain numbers of input symbols. It is assumed that extraneous symbols are pad symbols, that rate matching is employed or that the coder is somehow designed to avoid this issue. |
| $SS_b$ | $SS_{SB\_Hb} + SS_{SS\_b}$ | Total number of whole bits available for the S2S payload from all parts of the transmission |

Figure 8:
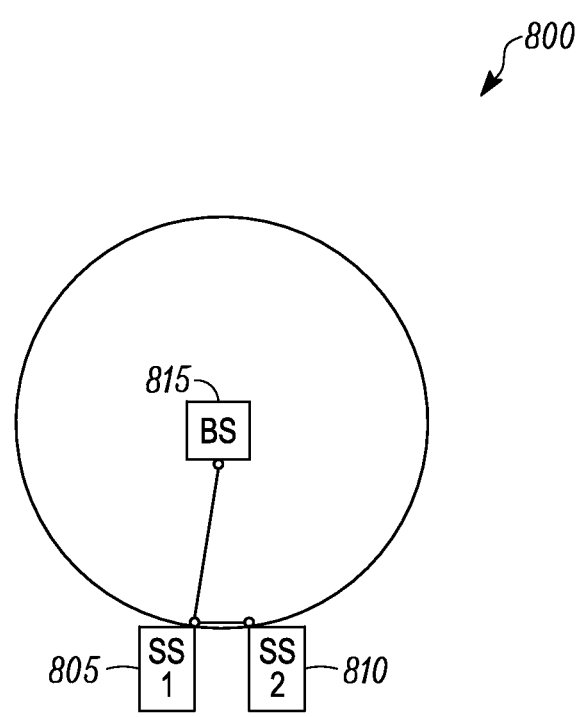
FIG. 8 illustrates an example network implementing the operation of at least some of the various embodiments.

FIG. 8 illustrates an example of a portion of a wireless communication network 800 for implementing at least some of the various embodiments discussed previously herein. As illustrated in FIG. 8, the SS pair (SS1 805 and SS2 810) are geographically located close together, while both the SSs (SS1 805 and SS2 810) are geographically remote from the BS 815. In this case, it is possible that the BS 815 would grant a 912 symbol uplink allocation from SS 1 805 using an MCS of QPSK ½ and an associated codeword length of 128 bits or 128 symbols. In this case, also consider that the link between SS 1 805 and SS 2 810 can sustain an MCS of 64QAM ½.

Figure 9:
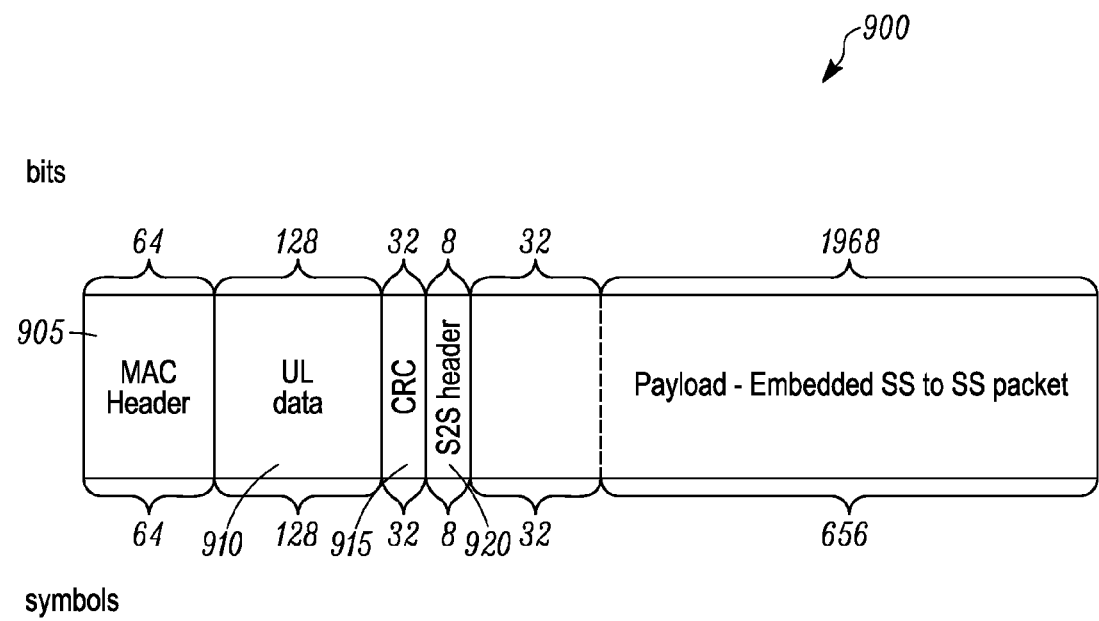
FIG. 9 illustrates a data transmission resulting from the example of FIG. 8 in accordance with some embodiments.

FIG. 9 illustrates a data transmission 900 for consideration along with the example of FIG. 8. As illustrated, the example data transmission 900 includes an 8 byte (64 bits) S2B MAC header 905; a 16 bytes (128 bits) of uplink messages 910, a 32 bit CRC 915 and a 1 byte S2S header 920.

The SS would need to send the S2B MAC header 905, the uplink messages 910, the CRC 915 and the S2S header 920 all at the $SB_{MCS}$, a total of 64+128+32+8=224 bits. This means that the first two codewords, or first 256 symbols, need to be transmitted at the $SB_{MCS}$, though only the first 224 symbols are needed, which leaves 32 symbols for use in transporting S2S data at the $SB_{MCS}$ rate. This also leaves 912−256=656 symbols available for transmission at the $SS_{MCS}$. Transmitting 656 symbols at the $SS_{MCS}$ provides an additional 1968 bits to the S2S part. This results in a total of 1968+32=2000 bits available for transporting data between the S2S pair.

Contrast this with sending all data to the BS at the $SB_{MCS}$. As in the previous example, the transmission must include the S2B MAC header 905, the uplink messages 910, and a CRC 915. It will not, though, require the transmission of an S2S header 920. Transporting all data at the $SB_{MCS}$, then, would provide 896−64−128−32=672 bits of payload. The S2S link provides nearly three times the capacity of the S2B link.

A novel method of using an uplink transmit resource for sending data directly to a peer device has been provided herein. This approach does not require any changes to base station equipment and can be implemented completely in subscriber devices. It allows existing systems to be retrofitted with direct link capabilities without requiring an upgrade to the existing infrastructure. This idea could be used in any system with multi-codeword uplink transmissions where station-to-station links are desired. A good example of such a system is 802.16e.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of communication between communication devices operating within a wireless communication system, the method comprising:
   a subscriber station requesting, from an infrastructure station, uplink resources assigned by the infrastructure station for communicating with the infrastructure station;
   the subscriber station composing a transmission burst for transmission using the assigned uplink resources, wherein the transmission burst comprises (i) a first portion including a subscriber-to-infrastructure station header field and composed for demodulation and decoding by the infrastructure station and at least one neighboring subscriber station, and (ii) a second portion including an embedded subscriber-to-subscriber packet composed for demodulation and decoding by the at least one neighboring subscriber station;
   transmitting, using the assigned uplink resources, the transmission burst from the subscriber station to the at least one neighboring subscriber station and to the infrastructure station;
   the infrastructure station receiving the transmission burst; and
   the infrastructure station demodulating and decoding the first portion and ignoring the second portion of the transmission burst.

2. A method as claimed in claim 1, further comprising:
   the neighboring subscriber station receiving the transmission burst; and
   the neighboring subscriber station demodulating and decoding the first portion and the second portion of the transmission burst.

3. A method as claimed in claim 1, wherein the at least one infrastructure station comprises one or more of a base station and a relay station.

4. A method as claimed in claim 1, wherein the subscriber station and the at least one neighboring subscriber station are communicatively coupled to the infrastructure station.

5. A method as claimed in claim 1, wherein the subscriber station and the at least one neighboring subscriber station are communicatively coupled to different infrastructure stations.

6. A method as claimed in claim 1, wherein the composing of the transmission burst comprises:

encoding the first portion of the transmission burst using a first modulation and coding scheme; and encoding the second portion of the transmission burst using a second modulation and coding scheme different from the first.

7. A method as claimed in claim 6, further comprising:

receiving the transmission burst by the at least one infrastructure station;

demodulating and decoding the first portion and the second portion of the transmission burst by the at least one infrastructure station using the first modulation and coding scheme; and not processing the second portion of the transmission burst by the at least one infrastructure station.

8. A method as claimed in claim 7, further comprising:

receiving the transmission burst by the at least one neighboring subscriber station;

demodulating and decoding the first portion of the transmission burst by the at least one neighboring subscriber station using the first modulation and coding scheme; and demodulating and decoding the second portion of the transmission burst by the at least one neighboring subscriber station using the second modulation and coding scheme; and processing the second portion of the transmission burst by the at least one subscriber station.

9. A method as claimed in claim 8, further comprising processing at least part of the first portion of the transmission burst by the at least one subscriber station to obtain information on how to demodulate and decode the second portion of the transmission burst.

10. A method as claimed in claim 6, further comprising the subscriber station selecting the first modulation and coding scheme to meet a channel quality between the subscriber station and the at least one infrastructure station.

11. A method as claimed in claim 6, further comprising the subscriber station selecting the second modulation and coding scheme to meet a channel quality between the subscriber station and the at least one neighboring subscriber station.

12. A method as claimed in claim 1, wherein the first portion of the transmission burst further comprises a trailer comprising a cyclic redundancy check of the first portion of the transmission burst.

13. A method as claimed in claim 1, wherein the first portion of the transmission burst occupies a first m codewords and wherein the second portion of the transmission burst occupies a set of remaining symbols of a transmission burst allocation.

14. A method as claimed in claim 13, wherein the first portion of the transmission burst further comprises an uplink data and a cyclic redundancy check, and wherein the second portion of the transmission burst further comprises a subscriber to subscriber header.

15. A method as claimed in claim 14, wherein the subscriber-to-infrastructure station header field describes the transmission burst as containing only the first m codewords, thereby causing the infrastructure station to ignore the second portion of the transmission burst.

16. A method as claimed in claim 1, wherein the second portion of the transmission burst begins at a first codeword (m+1) after a first m codewords in the first portion, and further wherein a remaining portion of the first m codewords that are not filled by one or more uplink data messages are filled with one or more pad bits.

17. A method as claimed in claim 16, wherein the first portion of the transmission burst further comprises an uplink data, a subscriber to subscriber header, and a cyclic redundancy check.

* * * * *

UNITED STATES PATENT AND TRADEMARK OFFICE
CERTIFICATE OF CORRECTION

PATENT NO. : 8,705,382 B2
APPLICATION NO. : 12/645550
DATED : April 22, 2014
INVENTOR(S) : Jeffrey D. Bonta et al.

It is certified that error appears in the above-identified patent and that said Letters Patent is hereby corrected as shown below:

IN THE SPECIFICATION:

In Column 4, Line 59, delete "transceiver 405" and insert -- transceiver 305 --, therefor.

In Column 7, Line 20, delete "SSMCS." and insert -- $SS_{MCS}$. --, therefor.

In Column 7, Line 46, delete "[m+1, n]" and insert -- [m+1, n]. --, therefor.

Signed and Sealed this
Thirty-first Day of May, 2016

Michelle K. Lee
*Director of the United States Patent and Trademark Office*